(No Model.)
C. A. HARP.
CHICKEN COOP.
No. 448,959. Patented Mar. 24, 1891.
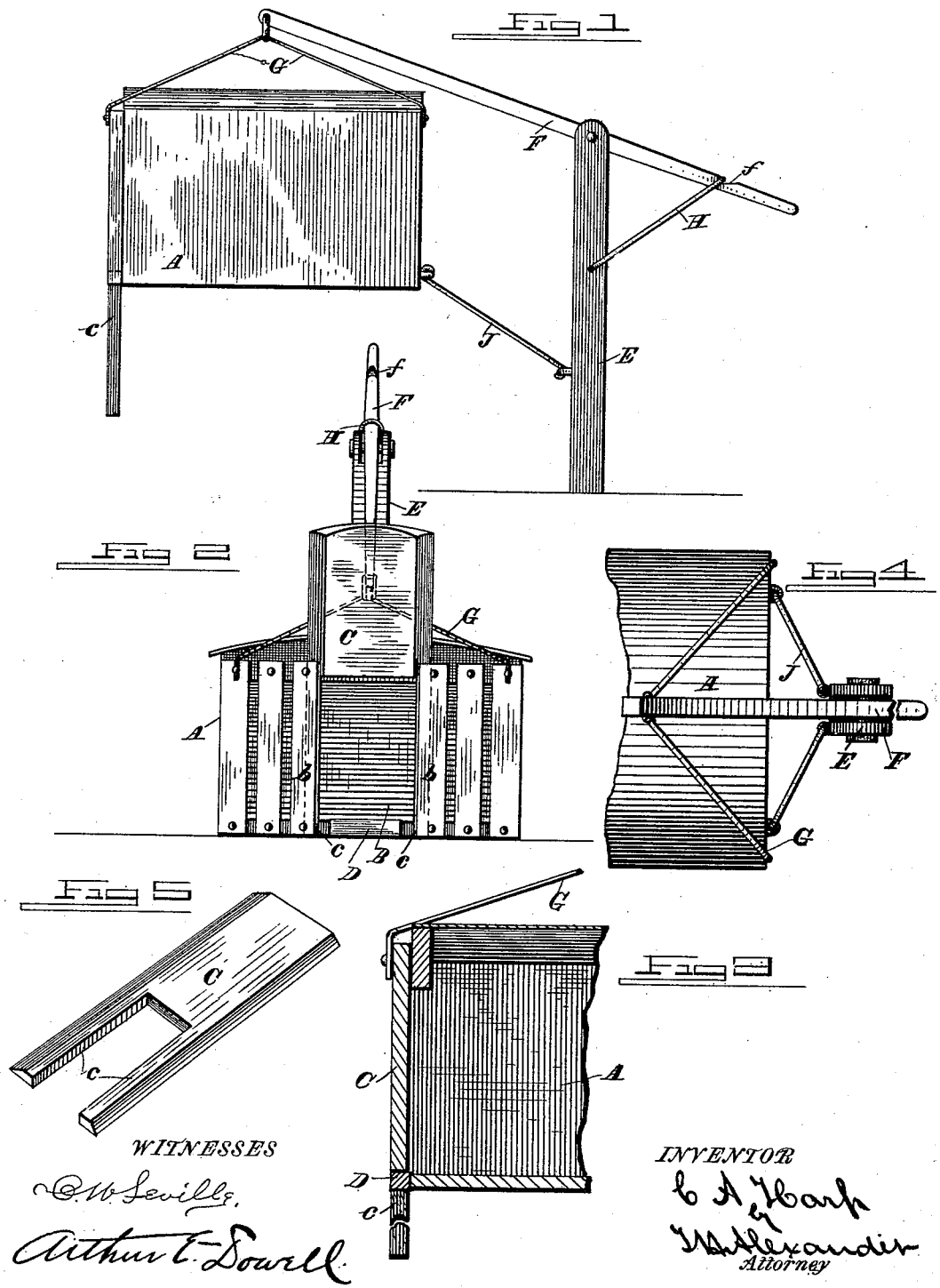

UNITED STATES PATENT OFFICE.

CHARLES A. HARP, OF RICE, TEXAS.

CHICKEN-COOP.

SPECIFICATION forming part of Letters Patent No. 448,959, dated March 24, 1891.

Application filed December 17, 1890. Serial No. 374,990. (No model.)

*To all whom it may concern:*

Be it known that I, CHARLES A. HARP, of Rice, in the county of Navarro and State of Texas, have invented certain new and useful Improvements in Chicken-Coops; and I do hereby declare that the following is a full, clear, and exact description thereof, reference being had to the accompanying drawings, and to the letters of reference marked thereon, which form part of this specification, in which—

Figure 1 is a side elevation, showing my improved coop with its suspending devices. Fig. 2 is a front view thereof, showing the same lowered. Fig. 3 is a detail sectional view thereof. Figs. 4 and 5 are detail views.

The present invention is an improvement in coops for fowls and other birds, and is especially designed for poultry-raisers, and its object is to enable the mother birds and their young to be caged and raised from the ground, so that the young will be out of danger from attacks of rodents, collecting water, &c.; and to this end the invention consists in the novel construction of the coop-door and the arrangement of devices for suspending the same, as will be hereinafter clearly described and claimed.

Referring to the drawings by letter, A designates a box-coop, two or more sides of which may be made tight, and in one side is a door-opening B, the side pieces *b* of which are grooved or beveled to engage or retain the correspondingly-tongued or beveled side edges of the door C, which can move vertically, as indicated, and from the lower corners of which depend legs *c c*, which are tongued or beveled to engage the side pieces *b*. A stop D is placed at the lower edge of the door-opening, between pieces *b*, to prevent the door proper slipping too far downward. The legs *c* of the door are about as long as the door itself, so that when the coop is set flat upon or lowered close to the ground the legs *c* strike the ground and prevent the door lowering farther with the coop, consequently raising the door and unclosing the door-opening, so that the chickens or animals in the cage can pass freely in and out so long as the cage is lowered; but if the cage is lifted sufficiently from the ground, door C will gradually close until legs *c* are lifted off the ground, when the door is entirely shut. The cage has a water-shedding roof.

E designates a post planted in the ground at the spot where it is desired to use the cage, and F is a lever fulcrumed on said post. One end of said lever is connected by wires or cords G to the cage, so that if the opposite end of the lever is depressed the cage will be lifted from the ground and the lever can be retained in this position, with the cage lifted, by means of a wire loop H, which is fastened at one end to post E, and its other end slips over the free end of lever F, and can be engaged with a notch *f* therein, as shown.

J J designate stay wires or rods, which are connected to the corners of the cage nearest post E, and the other ends of which can be attached to hooks or eyes on the post E, so that the cage will be braced when elevated and tossing or swaying thereof by wind prevented.

From the foregoing it will be seen that the cage is automatically opened when lowered and closed as it is raised, and it is so suspended that rodents and other destructive animals cannot get to the young birds therein, and there is no danger of the young birds being drowned by water collecting in the cage.

Having described my invention, what I claim as new, and desire to secure by Letters Patent thereon, is—

1. The combination of the cage and devices for raising and lowering the same, with a door for the cage having a depending leg by which it is caused to open when the cage is lowered, substantially as described.

2. The combination of the post, the lever fulcrumed thereon, and the device for fastening the lever, with the cage suspended from one end of the lever, the vertically-movable door thereof having depending legs, and the stays connected to the cage and post, substantially as set forth.

In testimony that I claim the foregoing as my own I affix my signature in presence of two witnesses.

CHARLES A. HARP.

Witnesses:
JOE W. KELLER,
ROBERT P. GATLIN.